US00RE35901E

United States Patent [19]

Wilkison et al.

[11] E

Patent Number: Re. 35,901

[45] Reissued Date of Patent: Sep. 22, 1998

[54] SOLID STATE ISOLATION DEVICE USING OPTO-ISOLATORS

[75] Inventors: Dennis E. Wilkison; Zhenyu Lawrence Liu, both of San Jose, Calif.

[73] Assignee: Cermetek Microelectronics, Inc., Sunnyvale, Calif.

[21] Appl. No.: 603,167

[22] Filed: Feb. 20, 1996

Related U.S. Patent Documents

Reissue of:

[64] Patent No.: 5,465,298
Issued: Nov. 7, 1995
Appl. No.: 227,604
Filed: Apr. 14, 1994

[51] Int. Cl.[6] ..... H04M 9/00; H02H 3/22

[52] U.S. Cl. ..... 379/406; 379/402; 379/399; 379/405; 379/410

[58] Field of Search ..... 379/406, 405, 379/399, 402, 410, 157, 189, 345, 412

[56] References Cited

U.S. PATENT DOCUMENTS 5,357,569 10/1994 Garcia et al. ..... 379/399
5,481,606 1/1996 Andrieu et al. ..... 379/399
5,500,895 3/1996 Yurgelites ..... 379/405
5,528,686 6/1996 Cwynar et al. ..... 379/405
5,555,293 9/1996 Krause ..... 379/405

*Primary Examiner*—Krista Zele
*Assistant Examiner*—Jacques M. Saint-Surin
*Attorney, Agent, or Firm*—Michael A. Glenn

[57] ABSTRACT

An improved solid state isolation device that uses opto-isolators to provide an electrical barrier between a telephone network and user telephone equipment includes a load and current control circuit, and an adjustable termination circuit to eliminate or reduce signal distortion and insensitivity to low signal levels resulting from low loop current, and lack of complex impedance compensation/termination for diverse telephone system parameters. An improved trans-hybrid return loss circuit reduces internal losses; while loop termination losses are reduced by the use of Shottky diodes in the line coupler circuit. A high pass filter improves common mode rejection ratios in the transmit and receive paths, and adjustable compensation is provided to account for manufacturing variances in the opto-isolators. An additional connection is also provided to adapt the opto-isolator circuit for use with 3-wire ring circuitry.

14 Claims, 5 Drawing Sheets

SOLID STATE ISOLATION DEVICE USING OPTO-ISOLATORS

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to isolation circuitry. More particularly, the present invention relates to an improved solid state isolation device such as used in telephone line interface equipment.

2. Description of the Prior Art

Devices that isolate user telephone equipment from telephone networks are required by government regulatory agencies, such as the U.S. Federal Communications Commission, to protect the telephone networks from anomalies related to the user equipment, for example as might result from the use of nonstandard or defective equipment or the inadvertent coupling of line voltages into the telephone network. Isolation also protects the user and user equipment from telephone network-related anomalies, such as voltage surges due to power supply fluctuation and lightning. A discussion of the state of the art with regard to isolation devices for telephone networks is provided in D. Wilkison, D. Lee, Solid State Isolation Device Using Opto-Isolators, U.S. Pat. No. 5,245,654 (14 Sep. 1993).

FIG. 1 is a block schematic diagram of an isolation circuit disclosed in U.S. Pat. No. 5,245,654. The figure shows a state of the art isolation circuit, also referred to as a direct access arrangement ("DAA") 10, that interfaces a user device 12, such as a modem, to a telephone network. The network is shown as a pair of signal lines 15T and 15R, often referred to as "tip" and "ring", respectively. The DAA 10 couples a pair of analog channels—transmit and receive—to the telephone network, while providing a high level of DC isolation between the user device and the lines 15T and 15R. The DAA also provides surge protection, rectification, off-hook detection, and ring detection.

The DAA 10 includes an isolation circuit 20 that is coupled to a user device 12 via transmit and receive lines 22, 23, and a line coupler 25 that is connected to the lines 15T and 15R. The isolation circuit and the line coupler communicate via a pair of signal lines 35, 37, that are also designated as L+ and L−, and which generally correspond to tip and ring.

The isolation circuit includes a transmit optical isolator circuit 50, a receive optical isolator circuit 52, and a hybrid 55. The optical isolator circuit 50 is disposed between the user device transmit channel and the hybrid; and the optical isolator circuit 52 is disposed between the receive channel and the hybrid. The optical isolator circuits 50, 52 serve to communicate analog signals across an isolation barrier, shown in the figure as a dashed line 57, while preventing an electrical connection across the barrier. The hybrid 55 interfaces the two-conductor line circuit, L+ and L−, to separate transmit and receive channels, which typically consist of four conductors, to permit full duplex operation.

The many advantages of using optical isolation instead of isolation transformers are discussed in U.S. Pat. No. 5,245,654, which is incorporated herein by this reference thereto. It has been found in practice that the use of optical isolation techniques to interface user equipment to a telephone network has presented unique problems and limitations, especially when such approach is applied to telephone networks having disparate operating parameters and ranges, such as are encountered in the world's many different telephone standards and systems.

Such problems and limitations include, for example:

1. Signal distortion and insensitivity to low signal levels resulting from low loop current, lack of complex impedance compensation/termination for diverse telephone system parameters, and/or internal circuit losses;
2. Limited physical interface capability, for example in applications requiring 3-wire ring connectivity;
3. Poor common mode rejection ratios in the transmit and receive paths; and
4. Lack of compensation for manufacturing variances in circuit components, especially variances in the opto-isolators.

It would be advantageous to improve known telephone network optical isolation circuits, such that the various problems and limitations attendant therewith are overcome.

SUMMARY OF THE INVENTION

The invention provides an improved solid state isolation device that uses opto-isolaters to provide an electrical barrier between a telephone network and user telephone equipment.

In particular, the invention provides a novel load and current control circuit and adjustable termination to meet different country standards for return loss and to improve sensitivity to low signal distortion levels resulting from low loop current. The invention also addresses lack of complex impedance compensation/termination for diverse telephone system parameters. The load and control circuit includes a Zener diode controlled voltage regulator that uses the loop current to establish a reference voltage for the receive path opto-isolator. A reference voltage is also established for the transmit AC line driver circuit. In this way linearity is improved and distortion is reduced, especially for applications involving low or varying loop current levels. The load and control circuit, along with an adjustable termination circuit also provides any desired load impedance to match the opto-islator circuit to the telephone system with which it is used Internal circuit losses are reduced through the use of an improved trans-hybrid return loss circuit; while loop voltage losses are reduced by the use of Shottky diodes in the line coupler circuit. Such loss reduction improves opto-isolator circuit performance in applications providing low loop currents, such as those applications involving long central office loops.

A high pass filter is provided to improve common mode rejection ratios in the transmit and receive paths, and adjustable compensation is provided to the opto-isolator drivers to account for manufacturing variances in circuit components, especially variances in the opto-isolators. An additional connection is also provided to adapt the opto-isolator circuit for use with 3-wire ring circuitry.

DETAILED DESCRIPTION OF THE INVENTION

Figure 1:
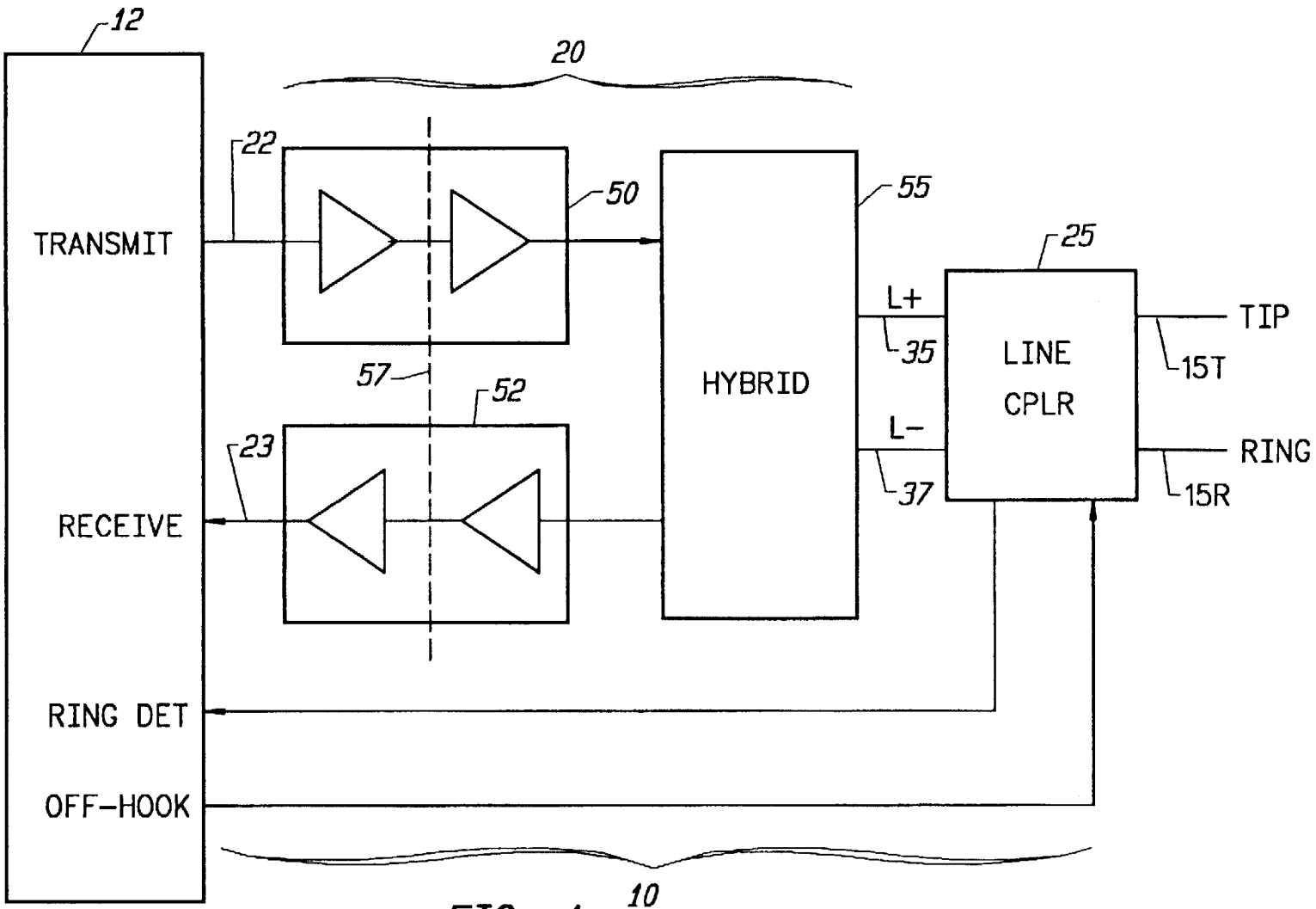
FIG. 1 (PRIOR ART)
FIG. 1 is a block schematic diagram of a prior art isolation circuit of the type that uses opto-isolators to interface a user device, such as a modem, to a telephone network.
Figure 2A:
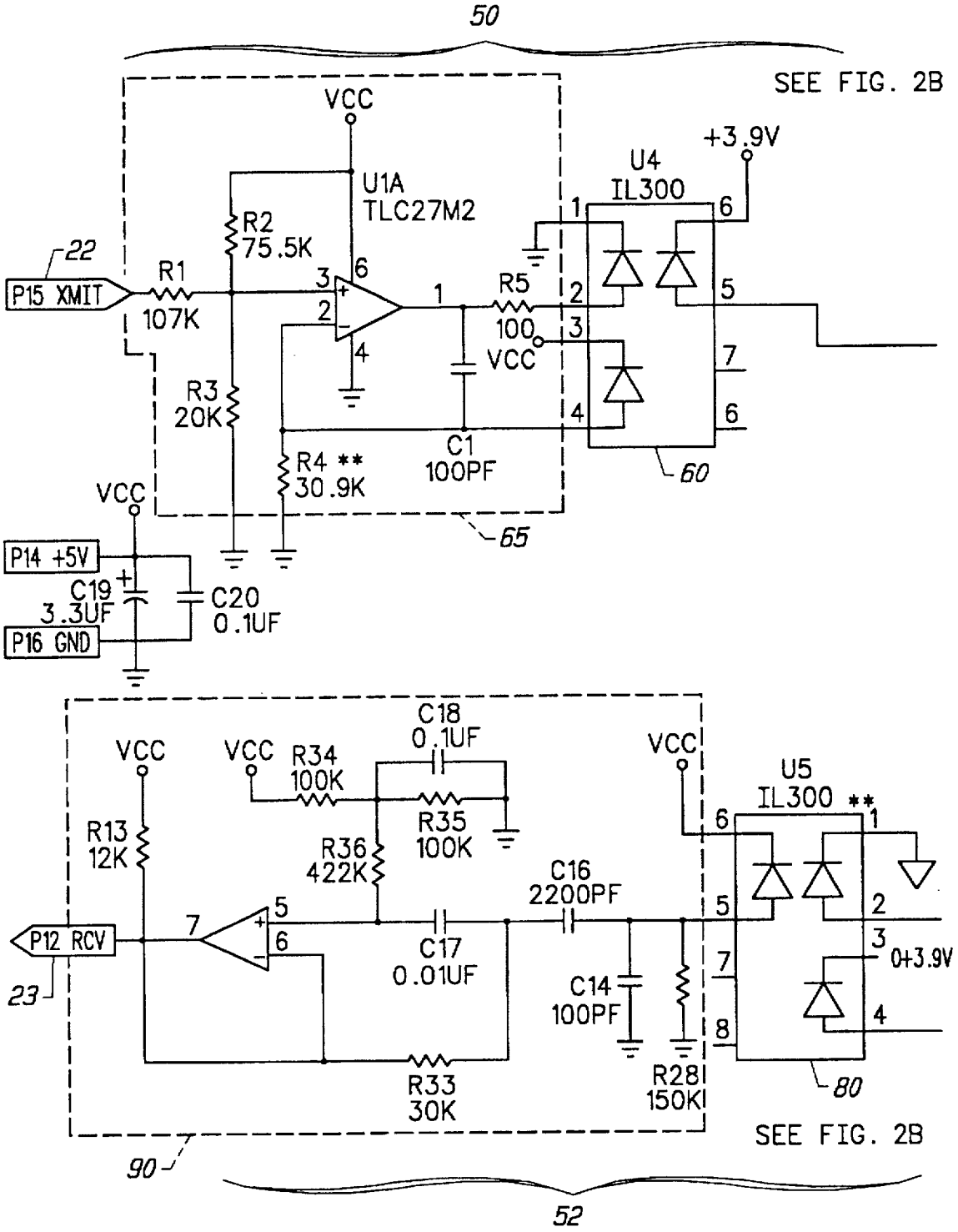
FIGS. 2a–2c provide a schematic diagram of an improved solid state isolation device using opto-isolators according to the invention.
Figure 2B:
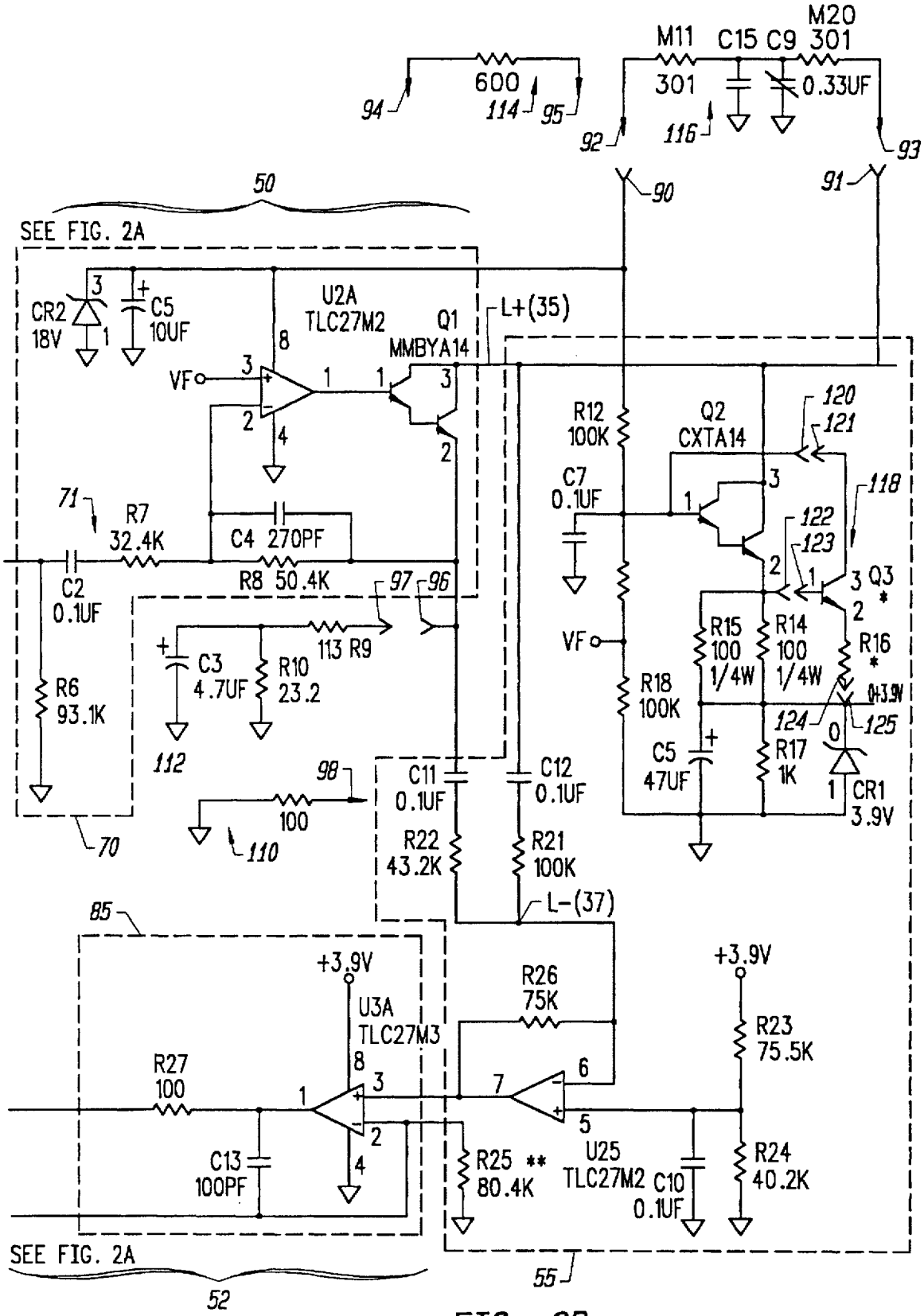
Figure 2C:
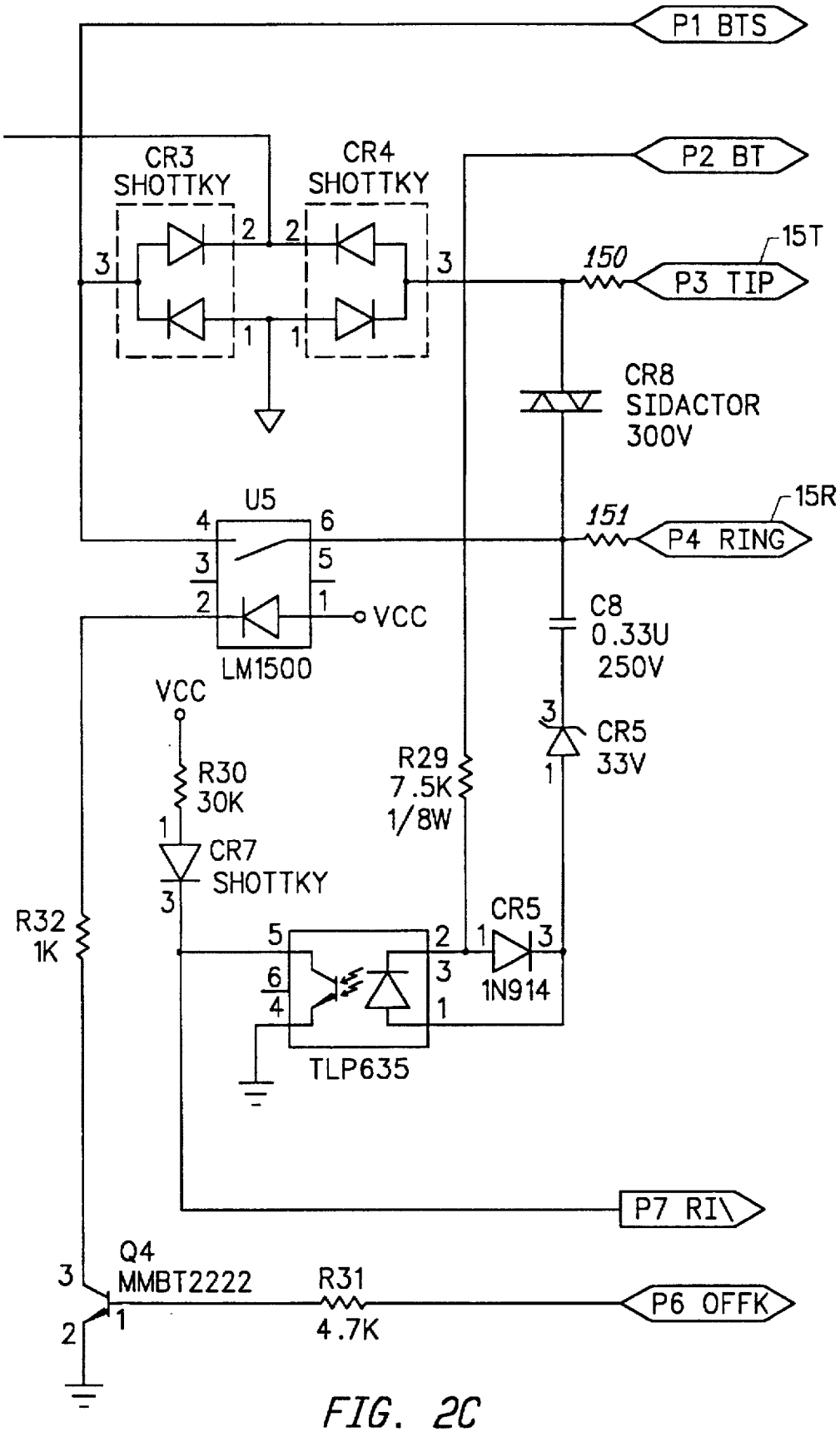

FIGS. 2a–2c provide a schematic diagram of an improved solid state isolation circuit 20 using opto-isolators according to the invention. The invention is architecturally similar to that of the prior circuit shown in FIG. 1, but resides in various improvements to such circuit, as discussed below. Common features of both the prior art and the invention shall be referred to herein by the same numeric designator.

The circuitry on the user device side of the isolation barrier 57 requires electrical power from a source other than the phone line to operate. Therefore, the isolation circuit is best suited for user device that can supply such power. For example, if the device is a modem, the modem side of the isolation circuit receives its power from the modem or computer supply. The line side of the isolation circuit receives its power from the DC voltage, nominally 48 volts before attenuation, on the line when the off-hook relay is closed. The isolation circuit operates to couple AC signals across the barrier 57, and so references to signals, voltage, and currents herein generally means AC signals, voltages, and currents.

The optical isolator circuit 50 includes an opto-isolator 60, also referred to as an optocoupler, a driver 65, and a current amplifier 70. The opto-isolator comprises an infrared LED that illuminates a pair of matched PIN photodiodes in a bifurcated arrangement. One of the photodiodes provides the output signal, and the other photodiode is used for feedback in the driver circuit to servo the LED drive current. The photodiodes are reverse biased so that they operate in a photoconductive mode where the current is directly proportional to the incident optical flux.

The driver 65 includes an operational amplifier U1A having a non-inverting input coupled to a transmit line 22 through a current-limiting resistor R1, and having an output coupled through a current-limiting resistor R5 to the anode the opto-isolator LED. The anode of the feedback photodiode is coupled to the inverting input of the operational amplifier U1A. This feedback connection causes the operational amplifier to provide enough LED current that the feedback photodiode current follows the voltage at the inverting input to track the signal voltage at the non-inverting input. Since the two photodiodes are matched, the current in the output photodiode tracks the current in the feedback photodiode and is thus proportional to the input voltage on the transmit line 22.

The current amplifier 70 includes an operational amplifier U2A that is configured as a transimpedance amplifier, i.e. a current-to-voltage converter, and a Darlington transistor pair Q1 that is configured as a voltage-to-current converter. The operational amplifier has a non-inverting input that is held at a fixed DC bias VF. The base of the transistor is coupled to the operational amplifier output, and the collector of the transistor is coupled to the L+ line 35. The emitter of the transistor is connected through a blocking capacitor C11 and a resistor R22 to the L− line 37 and through a feedback resistor R8 and filter capacitor C4 to the operational amplifier inverting input, and to the photodiode anode. The operational amplifier drives the transistor to maintain the emitter voltage at a level proportional to the photodiode current. Thus, the current through the transistor is a scaled up version of the photodiode current. The transistor sets up currents in the L+ and L− lines that are proportional to the voltage on the transmit line 22.

The optical isolator circuit 52 includes an opto-isolator 80, a driver 85, and a current-to-voltage amplifier 90. The driver 85 includes an operational amplifier U3A that has a non-inverting input coupled to receive the output signal from the hybrid 55, and that has an output coupled to the anode of the LED in the opto-isolator 80. The anode of the feedback photodiode is coupled to the inverting input of the operational amplifier U3A to provide the same servo control described above in connection with the opto-isolator 60.

A current-to-voltage converter 90 comprises an operational amplifier U1B that has a non-inverting input coupled to the cathode of the output photodiode in the opto-isolator, and that has an output coupled to the receive line 23. The output impedance of the operational amplifier is low enough that the output signal can be used directly by the user device.

Optical isolation circuits provide an acceptable amount of common mode rejection for most applications, typically on the order of −50 dB. However, a common mode rejection ratio of at least about 65 dB to 70 dB is required on many telephone lines in the United States. One feature of the invention is the provision of a high pass filter having a corner at 300 Hz, such that the filter is adapted to reject signals at 60 Hz and harmonics thereof (e.g. power line interference). The high pass filter consists of operational amplifier U1B, having a filter coupled to its input, comprising resistors R28, R33, and R36, and capacitors C14, C16, and C17. It has been found that employing such filter improves the common mode rejection ratio by about 25 dB.

In some applications of the invention, it is also desirable to provide a high pass filter in the transmit path to improve the common mode rejection ratio along this path. In such applications, a high pass filter comprising a circuit similar to that discussed above with regard to the receive path is inserted in the receive signal path between the capacitor C2 and the resistor R7, as indicated by numeric designator 71.

Optical coupler diodes are typically biased at about 7 mA. When the loop current drops below about 40 mA, for example if the line voltage across lines 15T and 15R drops below 7 volts, the current at the optical coupler diode falls below 7 mA. It has been found that a loop current below about 30 mA to 40 mA may cause signal distortion in the receive signal path, especially at higher signal levels, due to low current in the optical coupler diode. However, many telephone lines cannot supply enough current to drive both the load and the optical coupler diode. For example, it is not uncommon for telephone lines to have loop currents of about 20 mA or less.

The invention provides a constant voltage source to the receive optical coupler diode 80 (pin 3) in the form of a 3.9 volt reference voltage that is supplied by a load and current control circuit. The load and current control circuit provides a high AC impedance voltage regulator that consists of a current source derived from the loop current and supplied by the transistor Q2, a Zener diode CR1 having a Zener voltage of 3.9 volts, and resistors R14 and R15. Current is supplied to bias transistor Q2 by the voltage divider consisting of resistors R12, R18, and R19. The Zener diode CR1, resistor R17, and capacitor C5 establish a 3.9 volt reference at the node labeled +3.9 V. In this way, a constant reference voltage is supplied to the receive path photo-coupler diode without regard to low or varying loop current.

A DC load on the L+ and L− lines is provided by the Darlington transistor Q2 and a resistor network. A voltage divider comprising the resistors R12, R18, and R19 establishes the voltage on the base of the Darlington transistor Q2. This voltage, along the resistor network, determines the current flow. For further information, see the discussion of the load circuit herein.

The invention allows the use of an opto-isolator circuit on telephone lines having low or varying loop currents. The load and current control circuit provide a simulated inductor that does not block or interfere with the AC component of the loop signal, but that is used to simulate a DC resistance to shape the DC resistance slope. Because the load and current control circuit has a high AC impedance, the circuit does not affect the AC performance of the telephone line to which it is connected. Thus, the invention provides a high AC impedance voltage regulator that derives a constant voltage from a variable loop current.

The load and current control circuit is also used in the invention to generate a reference voltage VF that is supplied to the non-inverting input of operational amplifier U2A, which is the AC line driver for the transmit path. By providing a regulated reference voltage to the operational amplifier, the load and current control circuit stabilizes operation of the operational amplifier and thereby minimizes distortion in the transmit path.

Figure 3:
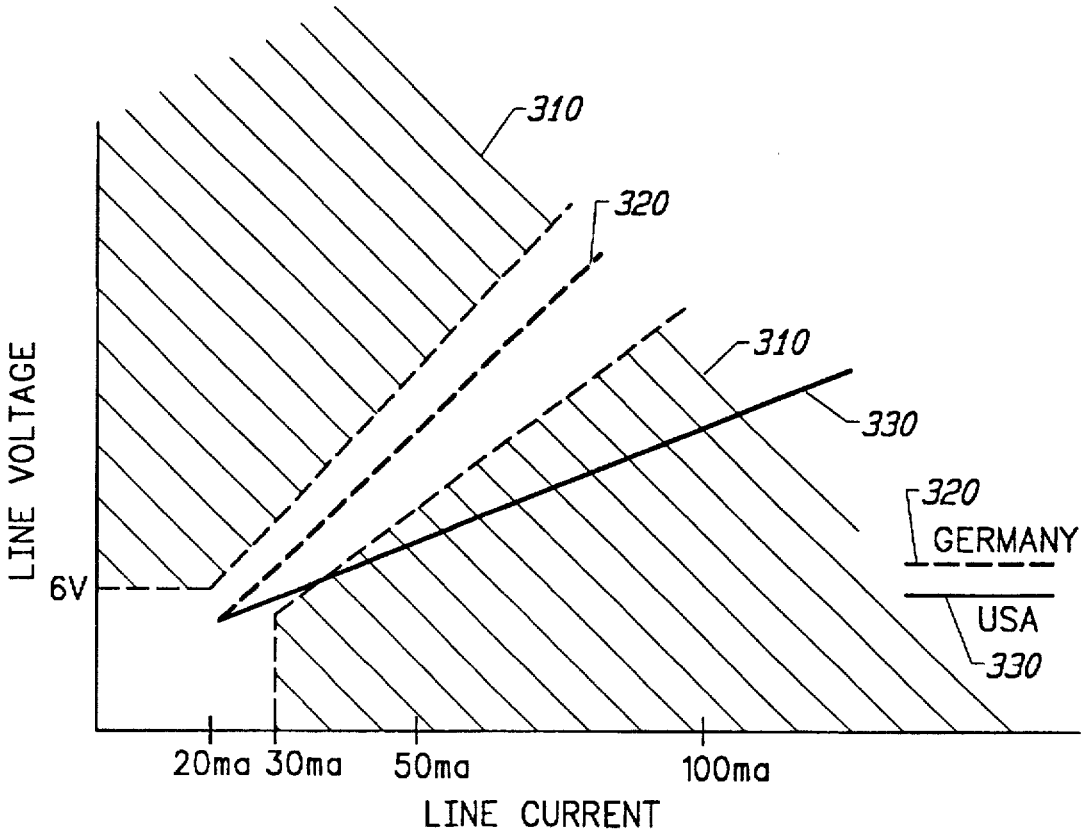
FIG. 3 is a graph plotting a load resistance window for an U.S. telephone standard and a German telephone standard.
Figure 4:
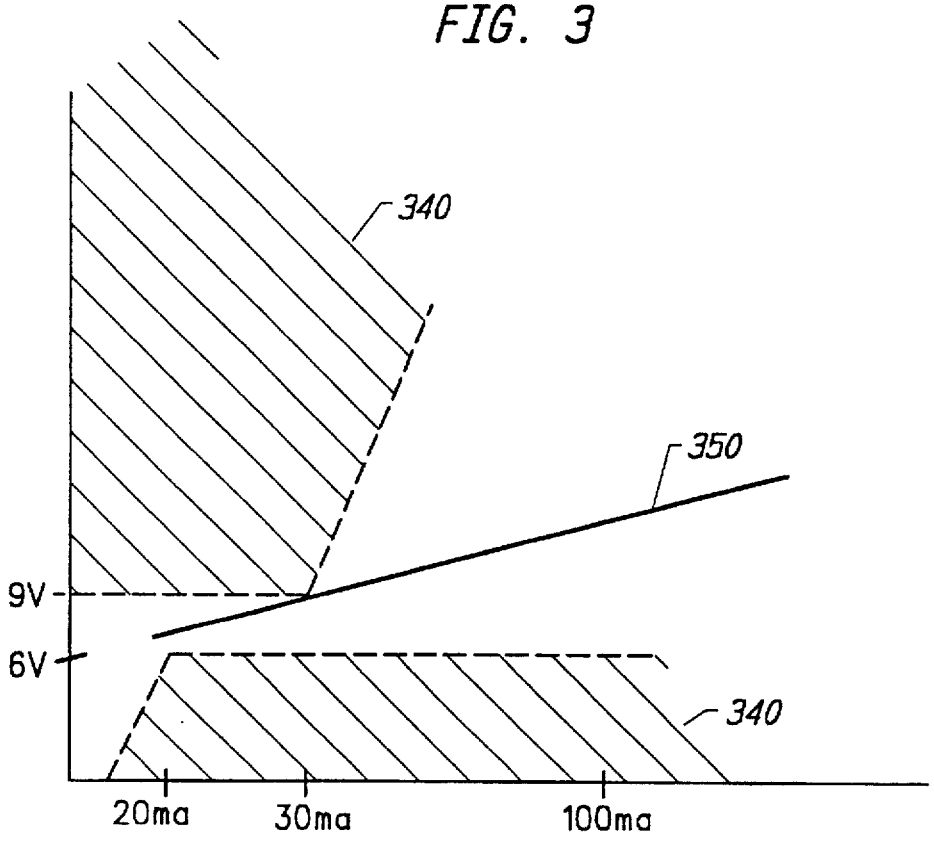
FIG. 4 is a graph plotting a load resistance window for a United Kingdom telephone standard.

FIG. 3 is a graph plotting a load resistance window (line voltage vs. line current) for a U.S. telephone standard 330 and a German telephone standard 320; and FIG. 4 is a graph plotting a load resistance window (line voltage vs. line current) for a United Kingdom telephone standard 350. The load and current control circuit is also instrumental in adapting the opto-isolator circuit for operation in the various world telephone standards, such as shown in FIGS. 3 and 4.

As can be seen from FIG. 3, the resistance window for the German standard has a steeper curve than that of the United States. The slope of this curve is a function of the value of the circuit 118 that is coupled to the opto-isolator circuit at the nodes identified by numeric designators 120, 122, and 125 via the terminals identified by the numeric designators 121, 123, and 124. The circuit 118 includes the transistor Q3 and the resistor R16. A tolerance window is shown in FIG. 3, as indicated by the lines identified by the numeric designator 310. Thus, the German resistance window curve must fall within the area defined by the lines 310. Changing the value of resistor R16 adjusts the load slope to provide compatible curves for other countries.

Likewise, load slopes for different tolerance windows can be provided, such as the load slope for the United Kingdom, that has a tolerance window defined by the lines identified by the numeric designator 340, as is shown in FIG. 4. In the case of the U.S. and U.K. slopes, it is not necessary to include the circuit consisting of the transistor Q3 and the resistor R16 because the slope for these standards is shaped by the resistors R14 and R15, which comprise a parallel network that is so configured to allow the use of in the circuit of smaller resistors having a lower power rating.

It is therefore an important feature of the invention to improve prior art opto-islator circuits by including a load and current control circuit that provides an AC line driver reference to reduce distortion in the circuit transmit path; a regulated voltage source to supply adequate bias current to the receive path opto-islator diode and thereby reduce receive path distortion in systems having low loop currents; and a variable load slope control that allows the opto-isolator circuit to be adapted for use in any of the various load slopes and curves used throughout the world.

The outgoing signal is removed at the emitter of the transistor Q1. During transmission a differential signal is developed across the transistor Q1. The resulting voltage at the emitter is communicated through a blocking capacitor C11 and a resistor R22 to the inverting input of the operational amplifier U2B that provides an output voltage that is representative of the outgoing signal.

The hybrid 55 provides a voltage signal equal to the superposition of the outgoing and incoming currents on the line, and also removes a desired fraction of the outgoing signal. For voice communications, a small amount of the outgoing signal, e.g. the speaker's voice, is allowed to pass through the receive channel to allow the speaker to hear his voice. For applications that use modems and the like, the circuit eliminates substantially all of the outgoing signals from the receive channel. This is dependent on the setting of resistors R21 and R22.

The hybrid circuit differential amplifier derives its signal from a voltage proportional to the total current flowing in the line generated across the transistor Q1 that is interposed in the L+ line 35. The differential amplifier includes an operational amplifier U2B and a resistor network R21, R22, R25. The voltages at the emitter and collector of the transistor Q1 (pins 2 and 3) are communicated through respective blocking capacitors C11 and C12 and respective resistors R22 and R21 to the inverting input of the operational amplifier U2B that provides an output voltage that is proportional to the superposition of the outgoing and incoming signals, as seen at the emitter and collector of the transistor Q1.

In many countries, a complex termination impedance is required for standard circuitry. The known approach to provide these impedances has been to provide a resistive adjustment to the impedance value. However, many of the world's various telephone systems require both a resistive and a capacitive component. For example, the United Kingdom sets the minimum return loss using a reference termination standard.

The invention includes a termination circuit (114/116) that is coupled to the opto-isolator circuit of the invention at the nodes identified by numeric designators 90 and 91. For the U.S. standard, the termination circuit consists of the resistor 114 that is coupled to the opto-isolator circuit via terminals 94 and 95; and for the U.K. standard the termination circuit consists the capacitors C9 and C15, and the resistors R11 and R20 that are coupled to the opto-isolator circuit via terminals 92 and 93.

A compensation circuit (110/112) is coupled to the opto-isoaltor circuit at the node identified by the numeric designator 96. The compensation circuit consists of a resistor 110 in the case of the U.S. standard, and that consists of a capacitor C3, and the resistors R9 and R10 in the case of the German and UK standards, provides compensation for the termination circuit, such that the signal path exhibits flat transmit frequency response. The values of the termination components are a function of the complex impedance requirements set by the country in which the opto-isolator circuit is used. The complex impedance requirements themselves are a function of the impedance network.

One feature of the invention derives a signal across the transistor Q1, i.e., a signal is taken from the emitter of transistor Q1 and an inverted signal is taken from the collector of transistor Q1. This arrangement reduces trans-hybrid losses while providing a very linear signal that does not introduce distortion into the cancel equation of the input of operational amplifier U2B. The feedback path defined by the capacitor C4 and the resistor R8 reduces distortion in the operational amplifier U2B. Poor hybrid return loss in opto-isolator circuits makes modem digital signal processors ineffective in detecting low level incoming signals.

Although part types and values are subject to some variation, those shown in the schematic represent the presently preferred embodiment. The opto-isolators are commercially available from the Optoelectronics Division of Siemens Components, Inc., Cupertino, Calif. under the part number IL300. Opto-isolators are subject to wide manufacturing variances in their primary to secondary transfer ratio. The invention provides transmit insertion loss and receive gain for the opto-isolators by adjusting the values of the resistors, R4 and R25, at the inverting inputs of the opto-isolator drivers, U1A and U3A, respectively. Representative values are provided below. These values may be established by substituting various discrete resistors, or by actively trimming the resistors to obtain an optimum value. The preferred values for various opto-isolators may be in the range of about 30.9 kΩ to about 42.2 kΩ for resistor R4, and from about 60.4 kΩ to about 82.5 kΩ for resistor R25.

The operational amplifiers are standard parts, in dual or quad packages. The transistors are surface mount devices. The resistors can be surface mount devices, or they can be fabricated by thick film techniques on a ceramic substrate if an additional level of miniaturization is required. The unpolarized capacitors (below 1 μf) are ceramic type, while the polarized capacitors (1 μf and above) are tantalum type.

The line coupler 25 includes an off-hook relay U6 that is interposed in the ring line 15R, and is controlled by the off-hook signal as communicated through a transistor Q4. Ring detect is provided via an opto-isolator U7 whose LED is connected to an input network that includes a blocking capacitor C8 and Zener diodes CR5.

In some countries, for example in the United Kingdom, a three wire ring circuit is required. One feature of the invention provides a three wire ring circuit that includes a resistor R29 across which a connection is brought out to a separate pin P2. This arrangement adapts the opto-isolator circuit to the 3-wire standard. By connecting the pin to the TIP it matches the standard 2-wire ring circuit.

The ring detect signal is maintained at +5 volts relative to equipment ground and is pulled low when current flows through the opto-isolator LED. Surge protection is provided by a voltage limiter CR8 across tip and ring lines 15T and 15R. This arrangement may require two additional resistors or fuses 150, 151 to insure compatibility with international safety standards.

An isolation system must provide internal loss reduction to assure proper connection between the user equipment and the telephone network. A bridge rectifier, consisting of Shottky diodes CR3 and CR4 is coupled between the tip and ring lines to ensure proper polarity of the L+ and L− signals, regardless of the polarity with which the line coupler is connected to the network. The use of Shottky diodes improves loop termination, reduces the internal resistance by about 50 ohms, and thereby allows the opto-islation circuit to be used on longer central office loops.

In conclusion, it can be seen that the invention provides several significant improvements to an otherwise very effective isolation technique. Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. In an isolation circuit for connecting analog transmit and receive channels in a user device to a line pair for full duplex communications on the line pair while providing an electrical isolation barrier between the user device and the line pair, comprising:

transmit optical isolation means, having an input located on the user device side of the barrier and an output on the line side of the barrier and being responsive to signals at its input, for generating analog signals at its output linearly corresponding to analog signals at its input;

said transmit optical isolation means comprising [a monolithic] *an* opto-isolator having an LED and first and second photodiodes[, each photodiode, on being reverse biased, delivering a current proportional to the optical flux incident thereon,] and a driver coupled between the transmit channel and said opto-isolator in a feedback configuration [such that each of said first and second photodiodes delivers a current proportional to a voltage signal from the transmit channel];

receive optical isolation means, having an input located on the line side of the barrier and an output on the user device side of the barrier and being responsive to signals at its input, for generating analog signals at its output linearly corresponding to analog signals at [it] *its* input;

means for coupling the input of said transmit optical isolation means to said transmit channel;

means for coupling the output of said receive optical isolation means to said receive channel; and duplexing means coupled to the line pair for directing signals at the output of said transmit optical isolation means onto the line pair, for directing signals on the line pair to the input of said receive optical isolation means; and for preventing at least a portion of any signals on the line pair that correspond to signals generated at the output of said transmit optical isolation means from reaching the input of said receive optical isolation means;

the improvement comprising:

load and current control means for providing a high AC impedance regulated reference voltage derived from loop current to a receive path optical isolation means photodiode, whereby said photodiode receives *adequate* bias [adequate] current to avoid receive path distortion independently of line current level;

said load and current control means providing a regulated reference voltage derived from said loop current to a transmit path line driver circuit, whereby transmit path distortion is avoided under conditions of varying load impedance.

2. The circuit of claim 1, further comprising:

an adjustable load DC impedance circuit for selectively shaping an isolation circuit load DC impedance slope.

3. The circuit of claim 1, further comprising:

high pass filter means associated with said optical isolation means in at least one of said transmit path and said receive path, and adapted to provide selected common mode rejection in said path.

4. The circuit of claim 1, further comprising:

adjustable termination means for selectably matching said isolation circuit to complex load impedances.

5. The circuit of claim 1, further comprising:

means for providing transmit insertion loss and receive gain compensation for said optical isolation means.

6. The circuit of claim 1, further comprising:

means for reducing loop DC termination loss of said isolation circuit.

7. The circuit of claim 1, further comprising:

trans-hybrid return loss means for reducing internal isolation circuit losses.

8. The circuit of claim 1, further comprising:

pin-out means for adapting said isolation circuit for use with 3-wire ring circuitry.

9. The isolation circuit of claim 1, including opto-isolators for providing an electrical barrier between a telephone network and user telephone equipment, said circuit further comprising:

a load and current control circuit for reducing signal distortion and insensitivity to low and varying loop current, and lack of complex impedance compensation/termination for diverse telephone network parameters, said load and control circuit comprising a high AC impedance voltage regulator that derives a constant voltage from a variable loop current, said voltage regulator comprising a Zener diode controlled voltage regulator that establishes a reference voltage for a receive path opto-isolator, and that establishes a reference voltage for a transmit path line driver circuit; said load and control circuit also comprising an adjustable resistive/capacitive network for selectively matching device load impedance to said telephone network.

10. The device of claim 9, further comprising:

a line coupler circuit including a bridge Shottky diode rectifier circuit coupled between said device and said telephone network for reducing device loop termination losses.

11. The device of claim 9, further comprising:

a high pass filter comprising a resistive/capacitive network in either of said device transmit and receive paths coupled between a respective opto-isolator output and a line driver input for improving common mode rejection ratios in said paths.

12. The device of claim 9, further comprising:

an adjustable resistive/capacitive termination network for selectably matching said device impedance to telephone networks having complex load impedances.

13. The device of claim 9, further comprising:

a trans-hybrid return loss circuit including a transistor having an emitter and a collector coupled to produce a differential output signal that is proportional to the superposition of signals along said receive path and transmit paths.

14. The isolation circuit of claim 1, further comprising:

a high AC impedance load and current control circuit for reducing signal distortion and insensitivity to low signal levels resulting from low circuit current, said load and control circuit including a Zener diode controlled voltage regulator that derives a reference voltage for said opto-isolator from a varying loop current.

* * * * *